(12) United States Patent
Hirayama

(10) Patent No.: US 12,489,852 B2
(45) Date of Patent: Dec. 2, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Yuya Hirayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 548 days.

(21) Appl. No.: 17/885,527

(22) Filed: Aug. 10, 2022

(65) Prior Publication Data

US 2023/0308552 A1  Sep. 28, 2023

(30) Foreign Application Priority Data

Mar. 22, 2022 (JP) ................. 2022-045701

(51) Int. Cl.
*H04N 1/00* (2006.01)
*G05B 19/4065* (2006.01)

(52) U.S. Cl.
CPC ..... *H04N 1/00039* (2013.01); *G05B 19/4065* (2013.01); *H04N 1/0005* (2013.01); *G05B 2219/37337* (2013.01)

(58) Field of Classification Search
CPC ............... B41J 29/393; G05B 19/4065; G05B 2219/37337; H04N 1/00039; H04N 1/0005; H04N 1/00042; H04N 1/00029; G03G 15/55; G03G 2215/00637; G10L 25/51
See application file for complete search history.

(56) References Cited

U.S. PATENT DOCUMENTS 7,502,570 B2  3/2009  Nishimura
2007/0070456 A1  3/2007  Nishimura

FOREIGN PATENT DOCUMENTS

| EP | 2926947 | 10/2015 |
| JP | 2007079263 | 3/2007 |
| JP | 4126717 | 7/2008 |
| JP | 2008290288 | 12/2008 |
| JP | 6711621 | 6/2020 |
| JP | 6868176 | 5/2021 |

OTHER PUBLICATIONS

"Office Action of Europe Counterpart Application", issued on Nov. 29, 2024, p. 1-p. 5.
"Search Report of Europe Counterpart Application", issued on Jul. 25, 2023, p. 1-p. 7.

*Primary Examiner* — An H Do
(74) *Attorney, Agent, or Firm* — JCIPRNET

(57) ABSTRACT

An information processing apparatus includes a processor configured to: acquire sound data representing a sound emitted by an apparatus; generate plural pieces of section sound data by dividing the sound data into sections where detection of words is not possible; and transmit specific section sound data among the plural pieces of section sound data, and operation information that indicates an operation of the apparatus and corresponds to the specific section sound data, to an external apparatus that analyzes the sound data of the apparatus, in association with each other.

20 Claims, 4 Drawing Sheets

FIG. 4

| | A | B | C | D | E | F | G | H | I | J | K | L | M | N | O |
|---|---|---|---|---|---|---|---|---|---|---|---|---|---|---|---|
| MOTOR A | 1 | 1 | 1 | 1 | 1 | 1 | 1 | 1 | 1 | 1 | 1 | 1 | 1 | 1 | 1 |
| MOTOR B | 1 | 1 | 1 | 1 | 1 | 1 | 1 | 1 | 1 | 1 | 1 | 1 | 1 | 1 | 1 |
| MOTOR C | 0 | 0 | 1 | 1 | 1 | 1 | 1 | 0 | 0 | 0 | 0 | 0 | 0 | 0 | 0 |
| MOTOR D | 0 | 0 | 0 | 0 | 0 | 0 | 0 | 0 | 0 | 0 | 0 | 0 | 0 | 0 | 0 |
| ... | | | | | | | | | | | | | | | |
| MODULE A | 1 | 1 | 1 | 1 | 1 | 1 | 1 | 1 | 1 | 1 | 1 | 1 | 1 | 1 | 1 |
| MODULE B | 1 | 1 | 1 | 1 | 1 | 1 | 1 | 1 | 1 | 1 | 1 | 1 | 1 | 1 | 1 |
| MODULE C | 1 | 1 | 1 | 1 | 1 | 1 | 1 | 1 | 1 | 1 | 1 | 1 | 1 | 1 | 1 |
| ... | 0 | 0 | 0 | 0 | 0 | 0 | 0 | 0 | 0 | 0 | 0 | 0 | 0 | 0 | 0 |
| ... | 0 | 0 | 0 | 1 | 1 | 1 | 0 | 0 | 0 | 0 | 0 | 0 | 0 | 0 | 0 |
| ... | 0 | 0 | 0 | 0 | 1 | 0 | 0 | 0 | 0 | 0 | 0 | 0 | 0 | 0 | 0 |
| ... | 0 | 0 | 0 | 0 | 0 | 0 | 0 | 0 | 0 | 0 | 0 | 0 | 0 | 0 | 0 |
| ... | 0 | 0 | 0 | 0 | 0 | 0 | 0 | 1 | 1 | 0 | 0 | 0 | 0 | 0 | 0 |
| ... | 0 | 0 | 0 | 0 | 1 | 1 | 1 | 0 | 0 | 0 | 1 | 1 | 1 | 1 | 1 |
| ABNORMAL SOUND DETERMINATION | 0 | 0 | 0 | 0 | 1 | 0 | 0 | 1 | 1 | 0 | 0 | 0 | 1 | 0 | 1 |
| OPERATION SCORE | 7 | 7 | 8 | 9 | 10 | 8 | 7 | 8 | 8 | 7 | 8 | 8 | 7 | 7 | 7 |

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-045701 filed Mar. 22, 2022.

BACKGROUND

(i) Technical Field

The present invention relates to an information processing apparatus, a non-transitory computer readable medium storing a program, and an information processing method.

(ii) Related Art

There is known a technique for detecting an abnormality in an apparatus by analyzing a sound emitted by the apparatus in a case where the apparatus operates.

JP2007-079263A discloses that a location where an abnormality has occurred in an apparatus is specified based on a normal sound stored in advance in a memory, a sound of the apparatus collected by a microphone, and operation information of the apparatus.

JP2008-290288A discloses that an abnormality in a mechanism in an apparatus is detected by converting a sound in the apparatus into an electric signal and analyzing the converted electric signal.

JP6868176B discloses that, in a case where a sound emitted by an apparatus is recorded, the start of recording the sound is warned.

SUMMARY OF THE INVENTION

There is known a service in which a business operator who provides an apparatus detects an abnormality in the apparatus and takes measures by recording and analyzing a sound emitted by the apparatus installed at the site of a customer. In this service, in a case where the sound emitted by the apparatus installed at the site of the customer is recorded, not only the sound emitted by the apparatus but also other sounds (for example, the sound around the apparatus) may be recorded. For example, it is conceivable that the voice of a person around the apparatus (for example, conversation) is recorded together with the sound emitted by the apparatus. In a case where the voice contains customer privacy information, it is conceivable that the customer privacy information may be leaked to a company that provides the apparatus, by recording the voice.

Aspects of non-limiting embodiments of the present disclosure relate to an information processing apparatus, a non-transitory computer readable medium storing a program, and an information processing method that transmit data of a sound that may detect an abnormality of an apparatus to an external apparatus that analyzes the data of the sound while avoiding an occurrence of a situation in which a conversation or a word is specified from data of a recorded sound, without limiting sound recording required to detect an abnormality of the apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: acquire sound data representing a sound emitted by an apparatus; generate a plurality of pieces of section sound data by dividing the sound data into sections where detection of words is not possible; and transmit specific section sound data among the plurality of pieces of section sound data, and operation information that indicates an operation of the apparatus and corresponds to the specific section sound data, to an external apparatus that analyzes the sound data of the apparatus, in association with each other.

BRIEF DESCRIPTION OF THE DRAWINGS

Exemplary embodiment(s) of the present invention will be described in detail based on the following figures, wherein:

FIG. 4 is a diagram illustrating an individual operation score, a result of abnormal sound determination, and an operation score.

DETAILED DESCRIPTION

Figure 1:
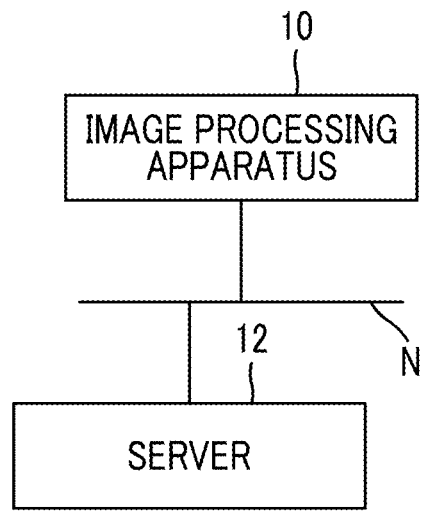
FIG. 1 is a block diagram illustrating a configuration of an information processing system according to an exemplary embodiment.

An information processing system according to an exemplary embodiment will be described with reference to FIG. 1. FIG. 1 is a block diagram illustrating an example of a configuration of the information processing system according to the exemplary embodiment.

The information processing system according to the exemplary embodiment includes an image processing apparatus 10 and a server 12. The information processing system may include a plurality of image processing apparatuses 10 and a plurality of servers 12.

The image processing apparatus 10 and the server 12 have a function of communicating with other apparatuses. The communication may be a wired communication using a cable or a wireless communication. As the wireless communication, for example, short-range wireless communication, Wi-Fi (registered trademark), or the like is used. The wireless communication of standards other than the above description may be used. For example, the image processing apparatus 10 and the server 12 may communicate with another device via a communication path N such as a local area network (LAN) or the Internet.

The image processing apparatus 10 is an example of an information processing apparatus, and has at least one of a printing function, a scanning function, or a copying function, for example. The image processing apparatus 10 is a printer, a scanner, a copier, or a multifunction device (for example, an apparatus having a printing function, a scanning function, a copying function, and the like).

The server 12 is an example of an external apparatus, and analyzes a sound emitted by an apparatus such as the image processing apparatus 10. Sound data representing the sound emitted by the image processing apparatus 10 is transmitted from the image processing apparatus 10 to the server 12, and the server 12 analyzes the sound data. For example, the sound data is analyzed to specify the cause of sound generation. For example, in a case where a sound that cannot be generated in a case where the apparatus operates normally (that is, an abnormal sound) is represented by sound data, the sound data is analyzed to specify the cause of the abnormal sound generation.

For example, a service in which a business operator who provides an apparatus detects an abnormality in the apparatus and takes measures by analyzing a sound emitted by the apparatus such as the image processing apparatus 10 installed at a site of a customer is conceivable. In this case, the server 12 is used for the service.

In the example illustrated in FIG. 1, the image processing apparatus 10 is exemplified as an apparatus as a target for analyzing a sound. Such an apparatus as the target is not limited to the image processing apparatus 10 and may be an apparatus other than the image processing apparatus 10.

Figure 2:
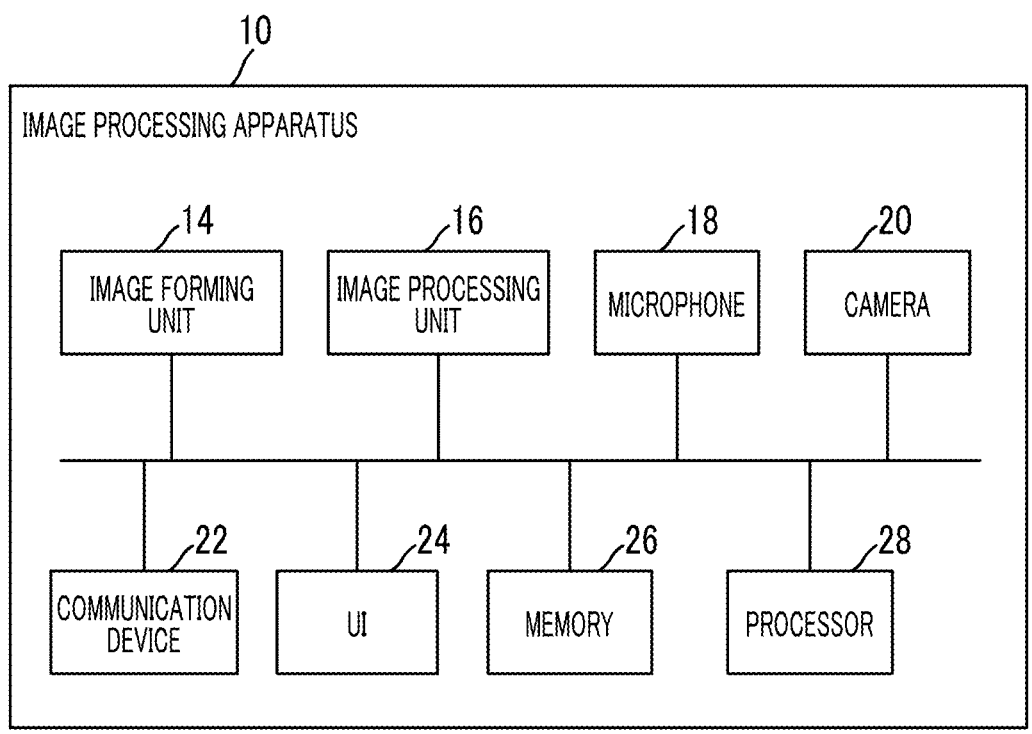
FIG. 2 is a block diagram illustrating a configuration of an image processing apparatus according to the exemplary embodiment.

Hereinafter, the configuration of the image processing apparatus 10 will be described with reference to FIG. 2. FIG. 2 illustrates an example of the configuration of the image processing apparatus 10.

The image processing apparatus 10 includes an image forming unit 14, an image processing unit 16, a microphone 18, a camera 20, a communication device 22, a user interface (UI) 24, a memory 26, and a processor 28.

The image forming unit 14 has at least one of a printing function, a scanning function, or a copying function, for example. For example, the image forming unit 14 may print image data, may generate image data by optically scanning an original document, or may print the scanned image data.

The image processing unit 16 performs image processing on the image data. The image processing is, for example, compression processing, decompression processing, character recognition processing (for example, OCR), and the like. The image data may be generated by the image processing apparatus 10 or may be transmitted to the image processing apparatus 10 from an apparatus other than the image processing apparatus 10.

The microphone 18 collects a sound emitted by the image processing apparatus 10 and a sound around the image processing apparatus 10. Thus, sound data representing the collected sound is generated. The microphone 18 may not be installed in the image processing apparatus 10 itself, and may be installed around the image processing apparatus 10 to collect the sound emitted by the image processing apparatus 10 and a sound around the microphone 18.

The camera 20 captures an image of the surroundings of the image processing apparatus 10. By the capturing, image data representing the surroundings of the image processing apparatus 10 is generated. The camera 20 may not be installed in the image processing apparatus 10 itself, and may be installed around the image processing apparatus 10 to capture an image of the surroundings of the image processing apparatus 10.

The communication device 22 includes one or a plurality of communication interfaces having a communication chip, a communication circuit, and the like. The communication device 22 has a function of transmitting information to another apparatus and a function of receiving information from the other apparatus. The communication device 22 may have a wireless communication function such as short-range wireless communication or Wi-Fi, or may have a wired communication function.

The UI 24 is a user interface and includes a display and an input device. The display is a liquid crystal display, an EL display, or the like. The input device is a keyboard, a mouse, an input key, an operation panel, or the like. The UI 24 may be a UI such as a touch panel having both the display and the input device.

The memory 26 is a device that forms one or a plurality of storage areas for storing data. Examples of the memory 26 include a hard disk drive (HDD), a solid state drive (SSD), various types of memories (for example, RAM, DRAM, NVRAM, and ROM), other storage devices (for example, an optical disk), and a combination thereof.

The processor 28 controls the operation of each unit of the image processing apparatus 10.

The processor 28 acquires the sound data generated by the sound collection by the microphone 18. The sound data acquired by the processor 28 will be referred to as "target sound data" below.

The processor 28 divides the target sound data into sections in which detection of a word is not possible, and generates a plurality of pieces of section sound data.

The "word" here refers to the smallest linguistic unit that has a meaning. Depending on the language, the minimum unit may differ. For example, the minimum unit is different between Japanese and English.

The "section in which detection of a word is not possible" refers to a section having a predetermined length of time, and to a section in which detection of the smallest unit in the language is not possible, that is, a section in which information having a meaning is not obtained from a sound in the section. For example, various types of personal information, names, product names, various types of security information, information regarding the privacy, technical information, or the like are information not to be detected. A section in which detection of a word related to the above information is not possible is determined as "the section in which detection of a word is not possible".

Since the length of the section in which detection of the word is not possible may differ depending on the language, the section in which detection of the word is not possible may be determined for each language. For example, in a case where the language is Japanese, the length of the section is about 0.5 seconds. In a case where the language is English, the length of the section is about 0.3 seconds. The above values are examples, and the values may be changed depending on a situation to which the exemplary embodiment is applied. The values may be changed by a user of the image processing apparatus 10, a business operator that provides a sound analysis service, or the like.

The processor 28 specifies specific section sound data from a plurality of pieces of section sound data, and transmits the specific section sound data and operation information indicating the operation of the image processing apparatus 10 to the server 12 in association with each other. The operation information transmitted at this time is operation information corresponding to the specific section sound data, that is, operation information in a section in which a sound represented by the specific section sound data is collected.

The operation information includes information indicating the logs of the image processing apparatus 10 (for example, a time stamp), information indicating the operation status of each component (for example, various motors and various sensors) forming the image processing apparatus 10, and the like.

The exemplary embodiment will be described below in more detail.

The target sound data includes sound data representing an abnormal sound of the image processing apparatus 10. The processor 28 determines whether or not the sound represented by the target sound data is an abnormal sound. A known technique may be used as a technique for determining an abnormal sound. For example, the processor 28 may determine a sound having a volume equal to or higher than a predetermined threshold value as the abnormal sound, or may determine a sound having a frequency out of a predetermined frequency range as the abnormal sound.

The image processing apparatus 10 is configured by a plurality of components. The processor 28 specifies, as the specific section sound data, section sound data in a section in which the number of operating components is equal to or less than a threshold value among a plurality of pieces of section sound data representing abnormal sounds. Then, the processor 28 transmits the specific section sound data to the server 12. This threshold value is predetermined. This threshold value may be changed by the user of the image processing apparatus 10, the business operator that provides the sound analysis service, or the like.

For example, the processor 28 calculates the number of operating components as an operation score, specifies section sound data in a section in which the value of the operation score is equal to or less than a threshold value, as specific section sound data, and transmits operation information in this section and the specific section sound data to the server 12 in association with each other.

The server 12 receives the specific section sound data and the operation information transmitted from the image processing apparatus 10, and analyzes the specific section sound data. In the server 12, the specific section sound data is analyzed, and the section sound data other than the specific section sound data is not analyzed. Thus, as compared with a case where the specific section sound data is analyzed and the section sound data other than the specific section sound data is also analyzed, it is possible to specify components that cause an abnormal sound, by narrowing down the types and number of components as an analysis target.

In addition, the processor 28 may specify, as the specific section sound data, each piece of section sound data in a non-continuous section among a plurality of sections in which the number of operating components is equal to or less than a threshold value, and transmit the specified specific section sound data and operation information in each section to the server 12 in association with each other. A word or a conversation may be specified from a plurality of pieces of section sound data in a continuous section. In order to avoid an occurrence of the above situation, each piece of section sound data in the non-continuous section is specified as the specific section sound data. The length of the non-continuous section is predetermined. The length of the non-continuous section may be changed by the user, the business operator, or the like. Depending on the language, the length of the non-continuous section may differ.

Further, the processor 28 may specify, as the specific section sound data, section sound data in each of two farthest sections among a plurality of continuous sections in which the number of operating components is equal to or less than a threshold value, and transmit the two specified pieces of specific section sound data and pieces of operation information in the two sections to the server 12 in association with each other. In the case of the section sound data in the two farthest sections, it may be more difficult to specify a conversation or a word than the section sound data of the two closer sections.

Examples will be described below.

Example 1

Figure 3:
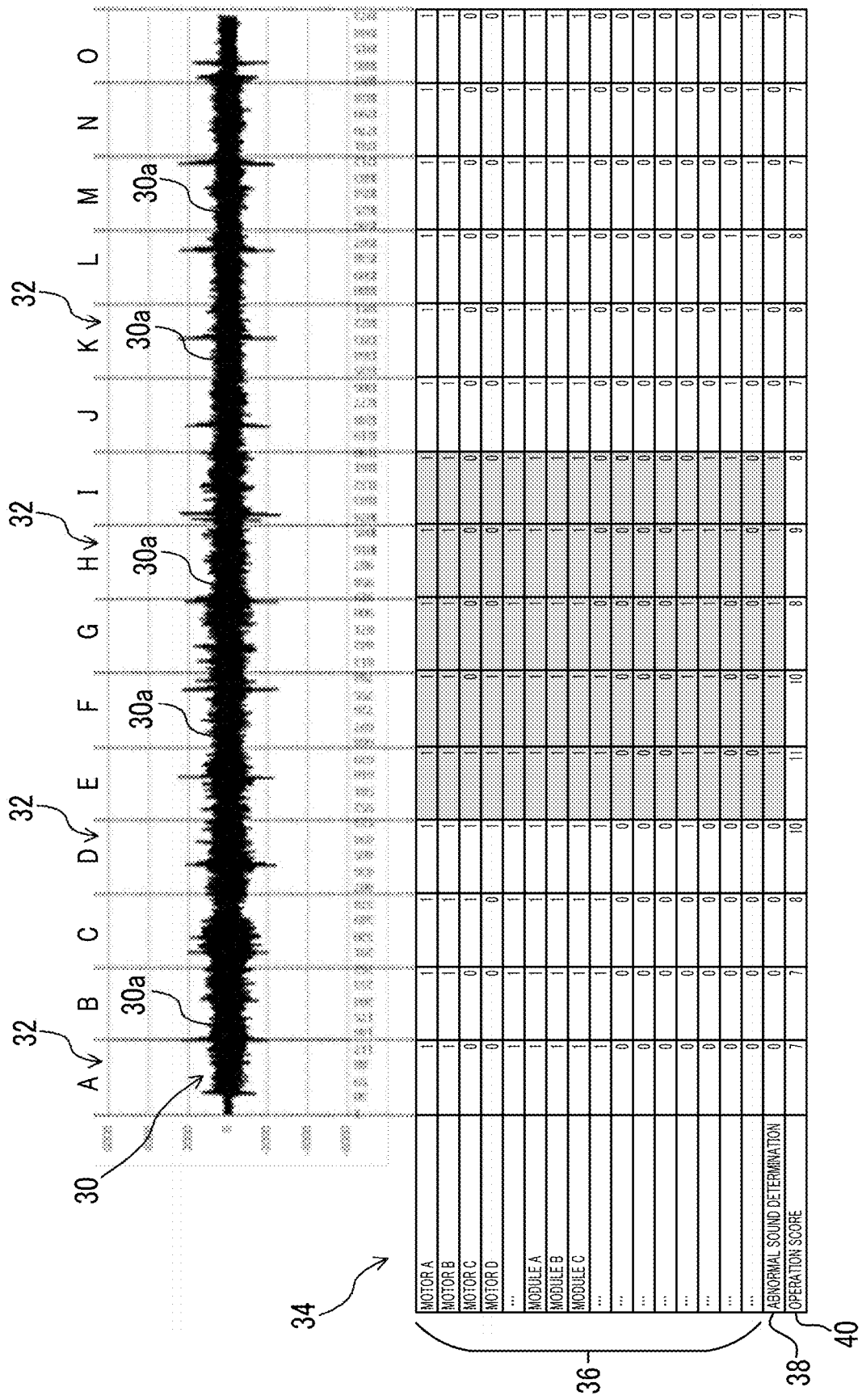
FIG. 3 is a diagram illustrating target sound data.

Example 1 will be described with reference to FIG. 3. FIG. 3 illustrates an example of the target sound data.

Target sound data 30 is data representing sounds collected over a certain period. FIG. 3 illustrates a temporal change of the target sound data 30. In the graph showing the target sound data 30, the horizontal axis represents a time and the vertical axis represents loudness.

The target sound data 30 is divided by a plurality of sections 32. Thus, the target sound data 30 is divided into a plurality of pieces of section sound data 30a. In the example illustrated in FIG. 3, sections A to O are formed, and the section sound data 30a in each of the sections A to O is generated.

Depending on the language, the length of the section 32 may be changed. For example, the length of the section 32 in a case where the language is Japanese may be shorter than the length of the section 32 in a case where the language is English.

For example, the processor 28 analyzes the target sound data to specify the language used in a conversation or voice represented by the target sound data. The processor 28 changes the length of the section in accordance with the specified language. The language is set in the image processing apparatus 10, and the processor 28 may set a section having a length corresponding to the set language. The processor 28 may change the length of the section depending on the location such as a position, a region, or country where the image processing apparatus 10 is installed. For example, the processor 28 sets a section having a length corresponding to English in a case where the image processing apparatus 10 is installed in an English-speaking area. The processor 28 sets a section having a length corresponding to Japanese in a case where the image processing apparatus 10 is installed in a Japanese-speaking area.

Table 34 shows the presence or absence (see the reference symbol 36) of the operation of each component forming the image processing apparatus 10, the result (see the reference symbol 38) of abnormal sound determination, and the operation score (see the reference symbol 40). The horizontal axis in Table 34 corresponds to the horizontal axis of the graph representing the target sound data 30 (that is, the axis representing the time).

For example, Motors A, B, C, D, . . . , Modules A, B, C, . . . , and the like are registered in Table 34 as components forming the image processing apparatus 10.

The presence or absence (see reference symbol 36) of the operation of the component is an example of the time stamp of an operation log of the component, and is expressed by a score such as a numerical value "1" or "0". The score of "1" indicates that the component operates, and a score of "0" indicates that the component does not operate. From Table 34, the section in which the component operates is specified for each component. In other words, the component operating in a certain section is specified.

The score for the operation of each component will be referred to as an "individual operation score" below.

For example, Motors A and B are operating over the sections A to O (individual operation score is "1"). On the other hand, Motor C operates over the sections C to E, but does not operate in the other sections. For other components, the operating section is also specified.

The processor 28 performs abnormal sound determination (see the reference symbol 38) based on the target sound data 30. The presence or absence of abnormal sound determination is expressed by a flag of the numerical value "1" or the numerical value "0". The numerical value "1" indicates that it is determined that an abnormal sound is generated, and the numerical value "0" indicates that it is not determined that an abnormal sound is generated. From Table 34, the presence or absence of the generation of an abnormal sound is specified for each section. For example, it is determined that an abnormal sound is generated in each of the sections E to I, and it is not determined that an abnormal sound is generated in the other sections.

The result of the abnormal sound determination only indicates the result of the determination of whether or not the abnormal sound has been generated in the image processing apparatus 10. For example, in the section in which it is determined that an abnormal sound is generated, it is only determined that the abnormal sound is generated in the image processing apparatus 10, and the component of the image processing apparatus 10, in which the abnormal sound is generated, is not specified.

The operation score (see the reference symbol 40) is calculated for each section. The operation score in a certain section is the sum of the individual operation scores of the components in the section. In Example 1, the operation score in a certain section coincides with the sum of the number of components operating in the section. For example, in the section G, since eight components operate, the operation score is "8". The processor 28 calculates the operation score in each section of the sections A to O.

The processor 28 specifies a section in which it is determined that an abnormal sound is generated (that is, a section in which the numerical value of the abnormal sound determination is "1") with reference to the result (see the reference symbol 38) of the abnormal sound determination. In the example illustrated in FIG. 3, the processor 28 specifies each section of the sections E to I as the section in which it is determined that an abnormal sound is generated.

The processor 28 specifies a section in which the operation score is equal to or less than a threshold value among a plurality of sections (for example, sections E to I) in which it is determined that an abnormal sound is generated, and specifies the section sound data 30a in the specified section as specific section sound data. The processor 28 transmits the specific section sound data and the operation information in the specified section to the server 12 in association with each other.

The processor 28 may specify a section having the smallest operation score among the plurality of sections in which it is determined that an abnormal sound is generated, specify the section sound data 30a in the specified section as the specific section sound data, and transmit the specific section sound data and the operation information in this section to the server 12 in association with each other.

In the example illustrated in FIG. 3, the section having the smallest operation score is the sections G and I having the operation score of "8". In this case, the processor 28 specifies the section sound data 30a in each of the sections G and I as the specific section sound data. The processor 28 transmits the section sound data 30a (specific section sound data) in the section G and the operation information indicating the operation of the image processing apparatus 10 in the section G, to the server 12 in association with each other. Similarly, the processor 28 transmits the section sound data 30a (specific section sound data) in the section I and the information indicating the operation of the image processing apparatus 10 in the section I, to the server 12 in association with each other.

Further, in a case where, in the plurality of sections in which it is determined that an abnormal sound is generated, a plurality of sections in which the operation score is equal to or less than the threshold value (for example, a plurality of sections having the smallest operation score) are continuous, the processor 28 may transmit the section sound data 30a in one section among the plurality of sections in which the operation score is equal to or less than the threshold value, to the server 12 as the specific section sound data. In a case where it is determined that an abnormal sound is generated in the sections G and H, and the operation scores of the sections G and H are the same and the smallest, the processor 28 transmits the section sound data 30a in any of the sections G and H to the server 12 as the specific section sound data. For example, the processor 28 transmits the section sound data 30a in the earliest section, the section sound data 30a in the latest section, or the section sound data 30a in the intermediate section, to the server 12 as the specific section sound data.

In a case where, in the plurality of sections in which it is determined that an abnormal sound is generated, a plurality of sections in which the operation score is equal to or less than the threshold value (for example, a plurality of sections having the smallest operation score) are not continuous, the processor 28 may transmit the section sound data 30a in each of the plurality of sections in which the operation score is equal to or less than the threshold value, to the server 12 as the specific section sound data. In the example illustrated in FIG. 3, the processor 28 transmits the section sound data 30a in each of the sections G and I to the server 12 as the specific section sound data.

In a case where the operation score of the section E is "8" as in the sections G and I, the processor 28 may transmit the section sound data 30a in each of the two farthest sections of the sections E, G, and I to the server 12 as the specific section sound data. In this example, the processor 28 transmits the section sound data 30a in the section E and the operation information in the section E to the server 12 in association with each other, and transmits the section sound data 30a in the section I and the operation information in the section I to the server 12 in association with each other.

In a case where the operation scores of the sections E to I are the same value (for example, "8"), the processor 28 may transmit the section sound data 30a in each of the two farthest sections as the specific section sound data, to the server 12. In this example, the processor 28 transmits the section sound data 30a in the section E and the operation information in the section E to the server 12 in association with each other, and transmits the section sound data 30a in the section I and the operation information in the section I to the server 12 in association with each other.

Example 2

Example 2 will be described below. In Example 2, the processor 28 specifies the specific section sound data based on the failure frequency of the component. This processing will be described below in detail.

For example, a plurality of section sound data representing abnormal sounds are specified. That is, a plurality of sections in which the numerical value for abnormal sound determination is "1" are specified. In this case, the processor 28 transmits the section sound data 30a in the section in which a component having a high failure frequency among a plurality of components forming the image processing apparatus 10 operates, to the server 12 as the specific section sound data in preference to the section sound data 30a in a section in which a component having a low failure frequency operates.

For example, the processor 28 changes the individual operation score for the operation of each component in accordance with the failure frequency. Specifically, the processor 28 sets the individual operation score of the component having a high failure frequency to be smaller than the individual operation score of the component having a low failure frequency.

Similar to Example 1, the operation score is the sum of the individual operation scores and is calculated for each section. By setting the individual operation score of the component having a high failure frequency to be smaller than the individual operation score of the component having a low failure frequency, the operation score in the section in which the component having a high failure frequency operates is smaller than the operation score in the section in which the component having a low failure frequency operates.

The section sound data 30a in the section in which the operation score is equal to or less than the threshold value and the section sound data 30a in the section where the operation score is the smallest are specified as the specific section sound data. Therefore, the section sound data 30a in the section in which the component having a high failure frequency operates is specified as the specific section sound data.

For example, information indicating the failure frequency of each component or each member (referred to as "failure frequency information" below) is stored in the server 12. The failure frequency information is transmitted from the server 12 to the image processing apparatus 10, and the processor 28 sets the individual operation score of each component in accordance with the failure frequency with reference to the failure frequency information. The failure frequency information may be periodically updated and transmitted from the server 12 to the image processing apparatus 10. For example, the failure frequency information is transmitted from the server 12 to the image processing apparatus 10 in a case where periodic maintenance is performed or software is updated.

The individual operation score of each component is set in accordance with the failure frequency of each component, and the processor 28 calculates the operation score of each section based on the set individual operation score of each component.

The processes after the operation score of each section are calculated is the same as the processing according to Example 1. That is, the processor 28 specifies the section sound data 30a in the section in which the operation score is equal to or less than the threshold value and the section sound data 30a in the section in which the operation score is the smallest, as the specific section sound data, and transmits the section sound data 30a to the server 12. Further, the processor 28 may transmit the section sound data 30a in the non-continuous section to the server 12 as the specific section sound data, as in Example 1. Other processes are the same as the processes according to Example 1.

A specific example of Example 2 will be described below with reference to FIG. 4. FIG. 4 illustrates the individual operation score of each component, the result of abnormal sound determination, and the operation score. The sections A to O are the same as the sections A to O according to Example 1.

For example, Motor D is a component having a higher failure frequency than components other than Motor D. In this case, the processor 28 sets the individual operation score of Motor D to be smaller than the individual operation scores of the other components. In the example illustrated in FIG. 4, the individual operation score of the component having a low failure frequency is "0" or "1", but the individual operation score of the component in the section in which the component having a high failure frequency operates is set to be smaller than "1" (for example, "−1"). The individual operation score in the section in which the component does not operate is set to "0".

Similar to Example 1, the processor 28 calculates the sum of the individual operation scores of the component as the operation score for each section.

In the example illustrated in FIG. 4, the values of the abnormal sound determination in the sections E to I are "1", and it is determined that the abnormal sound is generated in the sections E to I. Among the sections E to I, the value of the section G is "7", which is the smallest value. Therefore, the processor 28 transmits the section sound data 30a in the section G to the server 12 as the specific section sound data.

In a case where there are a plurality of sections in which the operation score is equal to or less than the threshold value (for example, in a case where there are a plurality of sections in which the operation score is the smallest), the processor 28 transmits the section sound data 30a in the non-continuous sections to the server 12 as the specific section sound data.

The processor 28 may transmit the section sound data 30a in a section including a timing at which it is expected that an abnormal sound is generated from the component, to the server 12 as the specific section sound data in preference to the section sound data 30a in other sections. Information indicating the timing at which it is expected that an abnormal sound is generated from the component is included in the failure frequency information. This processing will be described below in detail.

For example, in a case where an abnormal sound is likely to be generated in a case where Motor A starts to operate, the processor 28 sets the individual operation score of Motor A to be small in the section including the timing at which Motor A starts to operate. For example, the processor 28 sets the individual operation score to "−1". Information indicating that an abnormal sound is likely to be generated in a case where Motor A starts to operate is included in the failure frequency information.

Describing a specific example, it is assumed that Motor A starts to operate in the section A and operates until the section O. Further, it is known that an abnormal sound is likely to be generated in a case where Motor A starts to operate, and information indicating that the abnormal sound is likely to be generated in a case where Motor A starts to operate is included in the failure frequency information. In this case, the processor 28 sets the individual operation score of Motor A in the section A to "−1". The same applies to other components. Similar to Examples 1 and 2, the processor 28 calculates the sum of the individual operation scores of the component as the operation score for each section.

Example 3

Example 3 will be described below.

The processor 28 may transmit, to the server 12, a plurality of pieces of section sound data in a plurality of non-continuous sections in which periodicity of an abnormal sound is maintained, as the specific section sound data among the plurality of pieces of section sound data that represent the abnormal sound and are in a plurality of sections in which components that periodically generate the abnormal sound operate.

For example, the processor 28 generates a plurality of pieces of section sound data by setting the length of the section to be shorter than the length of the period of the abnormal sound. The processor 28 transmits a plurality of pieces of section sound data in which the component that periodically generates an abnormal sound operates among a plurality of pieces of section sound data representing the abnormal sounds, to the server 12 as the specific section sound data.

Figure 5:
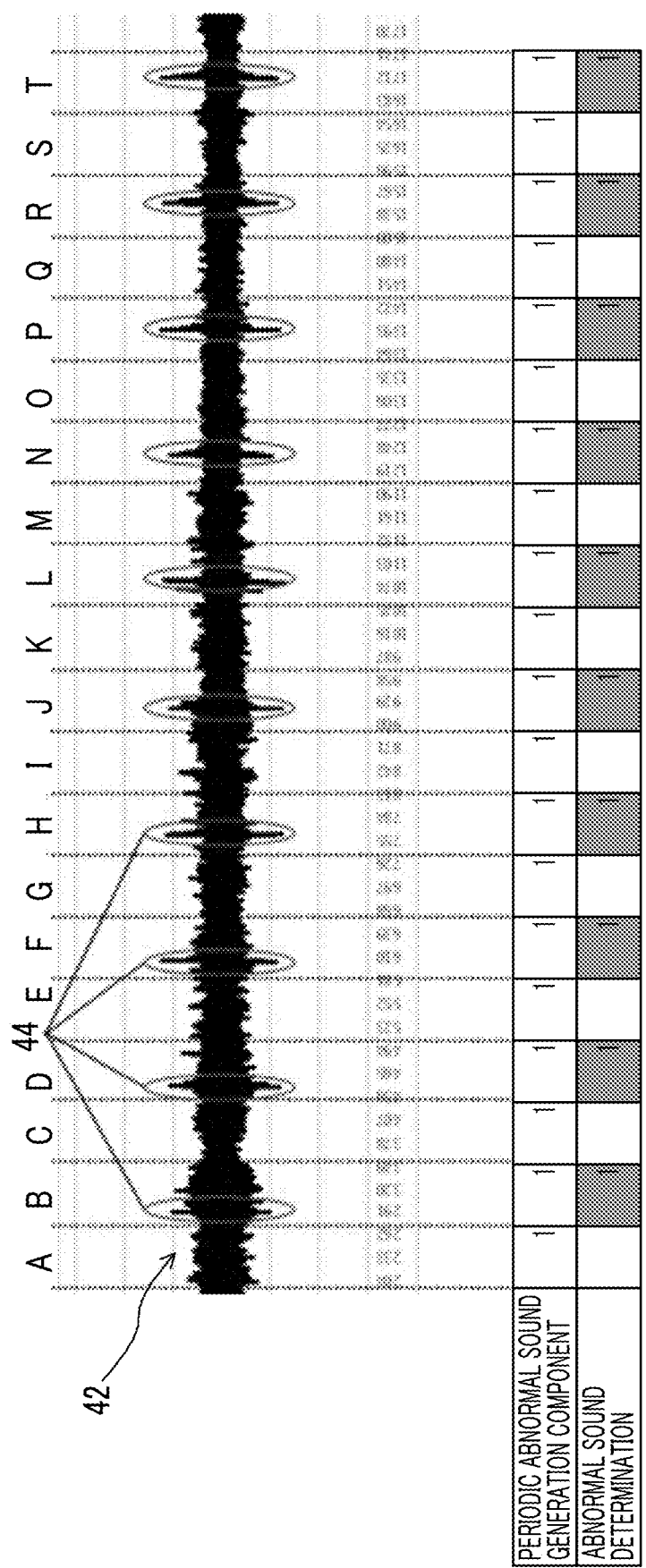
FIG. 5 is a diagram illustrating the target sound data.

A specific example of Example 3 will be described below with reference to FIG. 5. FIG. 5 illustrates an example of the target sound data. Further, FIG. 5 illustrates the individual operation score of the component that generates a periodic abnormal sound and the result of the abnormal sound determination.

A periodic abnormal sound 44 is represented by the target sound data 42. In this case, the processor 28 sets the length of the section dividing the target sound data 42 to be shorter than the length of the period of the periodic abnormal sound 44. In the example illustrated in FIG. 5, sections A to T are set, and the length of each section is shorter than the length of the period of the abnormal sound 44.

Further, information indicating the component that generates a periodic abnormal sound is included in the failure frequency information, and is transmitted from the server 12 to the image processing apparatus 10.

The processor 28 specifies a section in which the component that generates a periodic abnormal sound operates (that is, a section in which the individual operation score of the component is "1"), and it is determined that the abnormal sound is generated (that is, a section in which the value of the abnormal sound determination value is "1"). Then, the processor 28 specifies the section sound data 30a in the specified section as the specific section sound data. The processor 28 transmits the section sound data 30a in the specified section and the operation information in this section to the server 12 in association with each other. In this case, the processor 28 transmits the section sound data 30a in the specified section as the specific section sound data to the server 12 regardless of the value of the operation score, which is the sum of the individual operation scores.

In the example illustrated in FIG. 5, it is determined that an abnormal sound is generated in every other section. Specifically, it is determined that an abnormal sound is generated in the sections B, D, F, . . . . In this case, the processor 28 transmits the section sound data 30a in each of the sections C, D, F, . . . , as the specific section sound data to the server 12. Thus, a plurality of pieces of section sound data 30a in a plurality of non-continuous sections in which the period of an abnormal sound is maintained among a plurality of pieces of section sound data 30a in a plurality of sections in which the components that periodically generate abnormal sounds operate are transmitted to the server 12 as the specific section sound data.

Further, the processor 28 may not transmit all pieces of section sound data 30a in the sections C, D, F, . . . to the server 12 but transmit some pieces of section sound data 30a to the server 12. For example, the processor 28 transmits the section sound data 30a as the specific section sound data to the server 12 at intervals of a predetermined number of sections. The processor 28 may transmit the section sound data 30a in each of the first section and the last section among the plurality of sections in which it is determined that an abnormal sound is generated, to the server 12 as the specific section sound data. In the example illustrated in FIG. 5, the section B is the first section and the section T is the last section. In this case, the section sound data 30a in the section B and the section sound data 30a in the section T are transmitted to the server 12 as the specific section sound data.

The function of the image processing apparatus 10 is realized by the cooperation of hardware and software as an example. For example, the processor reads and executes a program stored in the memory of each device to realize the functions of each device. The program is stored in the memory via a recording medium such as a CD or a DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a microphone that collects a sound emitted by the information processing apparatus to generate sound data; and
    a processor configured to:
        acquire the sound data from the microphone;
        determine a language being used where the information processing apparatus is installed;
        set a length of time of one section according to a smallest linguistic unit of the language;
        generate a plurality of pieces of section sound data by dividing the sound data into sections where detection of words is not possible according to the length of time of one section; and
        transmit specific section sound data among the plurality of pieces of section sound data, and operation information that indicates an operation of the information processing apparatus and corresponds to the specific section sound data, to an external apparatus that analyzes the sound data of the information processing apparatus, in association with each other.

2. The information processing apparatus according to claim 1,
    wherein the sound data includes sound data representing an abnormal sound of the information processing apparatus, the information processing apparatus is configured by a plurality of components, and the processor is configured to: transmit, to the external apparatus, section sound data in a section in which the number of operating components is equal to or less than a threshold value among a plurality of pieces of section sound data representing the abnormal sound, as the specific section sound data.

3. The information processing apparatus according to claim 2, wherein the processor is configured to:
transmit, to the external apparatus, each piece of section sound data in a non-continuous section among a plurality of sections in which the number of operating components is equal to or less than the threshold value, as the specific section sound data.

4. The information processing apparatus according to claim 2, wherein the processor is configured to:
transmit, to the external apparatus, section sound data in a section including a timing at which it is expected that an abnormal sound is generated from a component, as the specific section sound data, in preference to section sound data in other sections.

5. The information processing apparatus according to claim 4, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

6. The information processing apparatus according to claim 2, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

7. The information processing apparatus according to claim 6, wherein the processor is configured to:
generate a plurality of pieces of section sound data by setting lengths of the sections to be shorter than a length of a period of the abnormal sound, and
transmit, to the external apparatus, a plurality of pieces of section sound data in which the components that periodically generate the abnormal sound operate, as the specific section sound data, among the plurality of pieces of section sound data representing the abnormal sound.

8. The information processing apparatus according to claim 3, wherein the processor is configured to:
transmit, to the external apparatus, section sound data in each of two farthest sections among a plurality of continuous sections in which the number of operating components is equal to or less than the threshold value, as the specific section sound data.

9. The information processing apparatus according to claim 3, wherein the processor is configured to:
transmit, to the external apparatus, section sound data in a section in which a component having a high failure frequency operates among the plurality of components, as the specific section sound data, in preference to section sound data in a section in which a component having a low failure frequency operates, among the plurality of pieces of section sound data representing the abnormal sound.

10. The information processing apparatus according to claim 9, wherein the processor is configured to:
transmit, to the external apparatus, section sound data in a section including a timing at which it is expected that an abnormal sound is generated from a component, as the specific section sound data, in preference to section sound data in other sections.

11. The information processing apparatus according to claim 9, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

12. The information processing apparatus according to claim 3, wherein the processor is configured to:
transmit, to the external apparatus, section sound data in a section including a timing at which it is expected that an abnormal sound is generated from a component, as the specific section sound data, in preference to section sound data in other sections.

13. The information processing apparatus according to claim 3, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

14. The information processing apparatus according to claim 8, wherein the processor is configured to:
transmit, to the external apparatus, section sound data in a section in which a component having a high failure frequency operates among the plurality of components, as the specific section sound data, in preference to section sound data in a section in which a component having a low failure frequency operates, among the plurality of pieces of section sound data representing the abnormal sound.

15. The information processing apparatus according to claim 8, wherein the processor is configured to:
transmit, to the external apparatus, section sound data in a section including a timing at which it is expected that an abnormal sound is generated from a component, as the specific section sound data, in preference to section sound data in other sections.

16. The information processing apparatus according to claim 8, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

17. The information processing apparatus according to claim 14, wherein the processor is configured to:

transmit, to the external apparatus, section sound data in a section including a timing at which it is expected that an abnormal sound is generated from a component, as the specific section sound data, in preference to section sound data in other sections.

18. The information processing apparatus according to claim 14, wherein the processor is configured to:
transmit, to the external apparatus, a plurality of pieces of section sound data in a plurality of non-continuous sections in which periodicity of an abnormal sound is maintained, as the specific section sound data, among the plurality of pieces of section sound data that represent the abnormal sound and are in a plurality of sections in which components that periodically generate the abnormal sound operate.

19. A non-transitory computer readable medium storing a program causing a computer to execute a process comprising:
collecting a sound emitted by an information processing apparatus to generate sound data by using a microphone;
acquiring the sound data from the microphone;
determining a language being used where the information processing apparatus is installed;
setting a length of time of one section according to a smallest linguistic unit of the language;
generating a plurality of pieces of section sound data by dividing the sound data into sections where detection of words is not possible according to the length of time of one section; and
transmitting specific section sound data among the plurality of pieces of section sound data, and operation information that indicates an operation of the information processing apparatus and corresponds to the specific section sound data, to an external apparatus that analyzes the sound data of the information processing apparatus, in association with each other.

20. An information processing method comprising:
collecting a sound emitted by an apparatus to generate sound data by using a microphone;
acquiring sound data representing a sound emitted by an apparatus;
determining a language being used where the information processing apparatus is installed;
setting a length of time of one section according to a smallest linguistic unit of the language;
generating a plurality of pieces of section sound data by dividing the sound data into sections where detection of words is not possible according to the length of time of one section; and
transmitting specific section sound data among the plurality of pieces of section sound data, and operation information that indicates an operation of the information processing apparatus and corresponds to the specific section sound data, to an external apparatus that analyzes the sound data of the information processing apparatus, in association with each other.

* * * * *